(12) United States Patent
Wang et al.

(10) Patent No.: US 8,817,436 B2
(45) Date of Patent: Aug. 26, 2014

(54) ELECTROSTATIC DISCHARGE PROTECTION DEVICE

(75) Inventors: Shih-Yu Wang, Hsinchu (TW);
Chieh-Wei He, Hsinchu (TW);
Yao-Wen Chang, Hsinchu (TW)

(73) Assignee: MACRONIX International Co., Ltd., Hsinchu (TW)

( * ) Notice: Subject to any disclaimer, the term of this patent is extended or adjusted under 35 U.S.C. 154(b) by 219 days.

(21) Appl. No.: 13/328,755

(22) Filed: Dec. 16, 2011

(65) Prior Publication Data
US 2013/0155554 A1   Jun. 20, 2013

(51) Int. Cl.
*H02H 9/00* (2006.01)
(52) U.S. Cl.
USPC ............................................................. 361/56
(58) Field of Classification Search
None
See application file for complete search history.

(56) References Cited

U.S. PATENT DOCUMENTS

| | | | | |
|---|---|---|---|---|
| 5,835,328 A * | 11/1998 | Maloney et al. | ............... | 361/111 |
| 6,011,681 A * | 1/2000 | Ker et al. | ..................... | 361/111 |
| 7,027,275 B2 * | 4/2006 | Smith | ............................. | 361/56 |
| 7,446,991 B2 * | 11/2008 | Chen | ............................. | 361/56 |
| 7,978,454 B1 * | 7/2011 | Pasqualini | ..................... | 361/111 |
| 2007/0247772 A1 * | 10/2007 | Keppens et al. | ............... | 361/56 |

* cited by examiner

*Primary Examiner* — Rexford Barnie
*Assistant Examiner* — David Shiao
(74) *Attorney, Agent, or Firm* — J.C. Patents

(57) ABSTRACT

An electrostatic discharge protection device is provided. The electrostatic discharge protection device includes a clamp unit and a control circuit. The clamp unit provides a discharging path from a first power line to a first ground line. The control circuit receives a first power voltage from the first power line and a second power voltage from a second power line. Wherein, when the first power voltage and the second power voltage are applied, the control circuit generates an isolation signal to disconnect the discharging path. When the first power voltage and the second power voltage are not applied, the control circuit generates a trigger signal according to an electrostatic signal from the first power line to turn on the discharging path.

10 Claims, 8 Drawing Sheets

ELECTROSTATIC DISCHARGE PROTECTION DEVICE

BACKGROUND OF THE INVENTION

1. Field of the Invention

The invention generally relates to a protection device, in particular, to an electrostatic protection device.

2. Description of Related Art

The electrostatic discharge (ESD) is a phenomenon of the electrostatic movement on a non-conductor. The phenomenon causes damages in an integrated circuit. For example, when a common charged body, such as a machine for packaging the integrated circuit or an instrument for testing the integrated circuit, touches a chip, the electrostatic charges are produced. At the moment, the electrostatic charges may cause damages to the integrated circuit in the chip.

For preventing the damages of the integrated circuit which is affected by the ESD from the outside thereof, an electrostatic discharge protection circuit is usually implemented in the integrated circuit. In a silicide process, a common electrostatic discharge protection is implemented with a silicide block on an n-type transistor to have a property of uniform turn-on while the electrostatic discharge occurs. Furthermore, a more completed discharging path is offered. Nevertheless, the additional silicide block increases the complex and the cost of the fabrication process.

For improving the drawback described above, most of the electrostatic discharge protection devices now already remove the silicide block, and use a control circuit to control an n-type transistor instead. However, this kind of design must include a good control circuit to turn on the n-type transistor properly. Besides, the control circuit is usually affected by noises, and further causes the electrostatic discharge protection device to work abnormally.

SUMMARY OF THE INVENTION

The invention is directed to an electrostatic discharge protection device. The control circuit of the electrostatic discharge protection device controls the clamp unit by two voltages from two different power lines, and further enhances the anti-noise ability of the electrostatic discharge protection device.

The invention provides an electrostatic discharge protection. The electrostatic discharge protection includes a clamp unit and a control circuit. The clamp unit provides a discharging path from a first power line to a first ground line. The control circuit receives a first power voltage from the first power line and a second power voltage from the second power line. Wherein, when the first power voltage and the second power voltage are applied, the control circuit generates an isolation signal to disconnect the discharging path. When the first power voltage and the second power voltage are not applied, the control circuit generates a trigger signal according to an electrostatic signal from the first power line to turn on the discharging path.

According to an embodiment of the invention, the control circuit includes a trigger unit and a latching unit. The trigger unit is electrically connected to the first power line, the second power line and the first ground line wherein the trigger unit generates a first control signal according to the first power voltage and according to the second power voltage, and the trigger unit generates a second control signal according to the electrostatic signal. The latching unit is electrically connected to the first power line and the first ground line wherein the latching unit generates the isolation signal according to the first control signal, and the latching unit generates the trigger signal according to the second control signal.

According to an embodiment of the invention, the trigger unit includes a first p-type transistor, a resistor, and a first inverter. A source of the first p-type transistor is electrically connected to the first power line, and a gate of the first p-type transistor is electrically connected to the second power line. A first end of the resistor is electrically connected to a drain of the p-type transistor, and a second end of the resistor is electrically connected to the first ground line. An input terminal of the first inverter is electrically connected to the first end of the resistor, and an output terminal of the first inverter outputs the first control signal or the second control signal.

According to an embodiment of the invention, the latching unit includes a second p-type transistor, a second inverter, and a first n-type transistor. A source of the second p-type transistor is electrically connected to the first power line, and a drain of the second p-type transistor generates the isolation signal or the trigger signal. An input terminal of the second inverter is electrically connected to the drain of the second p-type transistor, and an output terminal of the second inverter is electrically connected to a gate of the second p-type transistor. A source of the first n-type transistor is electrically connected to the first ground line, and a drain of the first n-type transistor is electrically connected to the drain of the second p-type transistor, and a gate of the n-type transistor receives the first control signal or the second control signal.

The invention provides an electrostatic discharge protection device. The electrostatic discharge protection device includes a control circuit and a clamp unit. The control circuit is electrically connected to a first power line, a second power line, and a first ground line. The clamp unit provides a discharging path from the first power line to the first ground line. Wherein, when a first power voltage and a second power voltage are respectively applied to the first power line and the second power line, the control circuit generates an isolation signal to disconnect the discharging path. When the first voltage and the second voltage are not provided to the first power line and the second power line, the control unit generates a trigger signal according to an electrostatic signal from the first power line to turn on the discharging path.

Based on the description above, the invention provides an electrostatic discharge protection device. The control circuit of the electrostatic discharge protection device controls the clamp unit according to the two power voltages respectively from the different power lines. Thus, if the first power voltage and the second power voltage are applied, the control unit which is controlled by the two power voltages will not be affected by noises, and will further enhance the anti-noise ability of the electrostatic discharge protection device.

It is to be understood that both the foregoing general description and the following detailed description are exemplary, and are not intended to limit the scope of the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
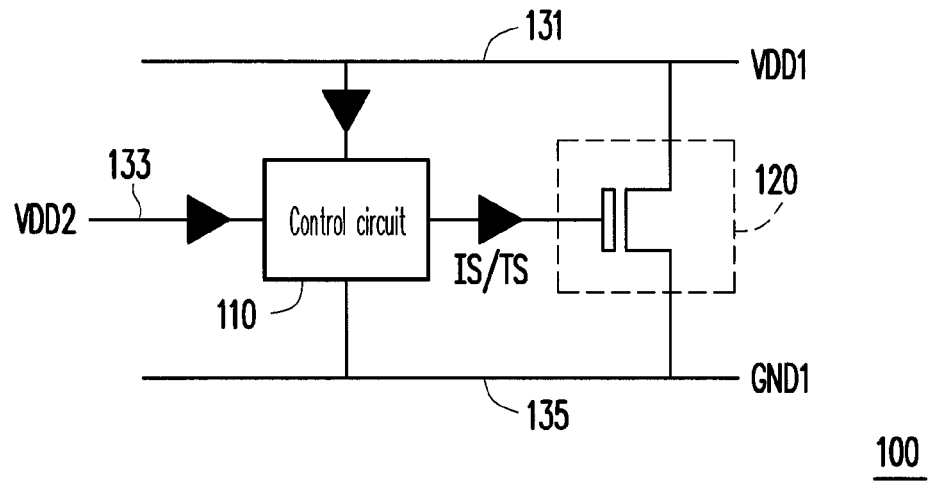
FIG. 1 shows a schematic function block of the electrostatic discharge protection device according to the first embodiment of the invention.

Reference will now be made in detail to the present embodiments of the invention, examples of which are illustrated in the accompanying drawings. Wherever possible, the same reference numbers are used in the drawings and the description to refer to the same or like parts.

The First Embodiment

FIG. 1 shows a schematic function block of the electrostatic discharge protection device according to the first embodiment of the invention. Please refer to FIG. 1. The electrostatic discharge protection device 100 includes a control circuit 110 and a clamp unit 120. The control circuit 110 is electrically connected to a power line 131, a power line 133, and a ground line 135. Besides, the control circuit 110 is used to receive a power voltage VDD1 from the power line 131, receive a power voltage VDD2 from the power line 133, and receives a ground voltage GND1 from the ground line 135. The clamp unit 120 is electrically connected between the power line 131 and the ground line 135, and is used to provide a discharging path from the power line 131 and the ground line 135.

In the actual application, when the power voltage VDD1 and the power voltage VDD2 are applied, the control unit 110 generates a isolation signal IS to the control terminal of the clamp unit 120 and cause the clamp unit 120 to disconnect the discharging path. Relatively, when the power voltage VDD1 and the power voltage VDD2 are not applied, an electrostatic event may occur on the power line 131. For coping with this condition, if the electrostatic event occurs, an electrostatic signal will be coupled from the power line 131 to the control unit 110. And the control unit 110 will generate a trigger signal TS according to the electrostatic signal and the electrostatic signal will be transmitted to the control terminal of the clamp unit 120 to allow the clamp unit 120 to turn on the discharging path.

Figure 2:
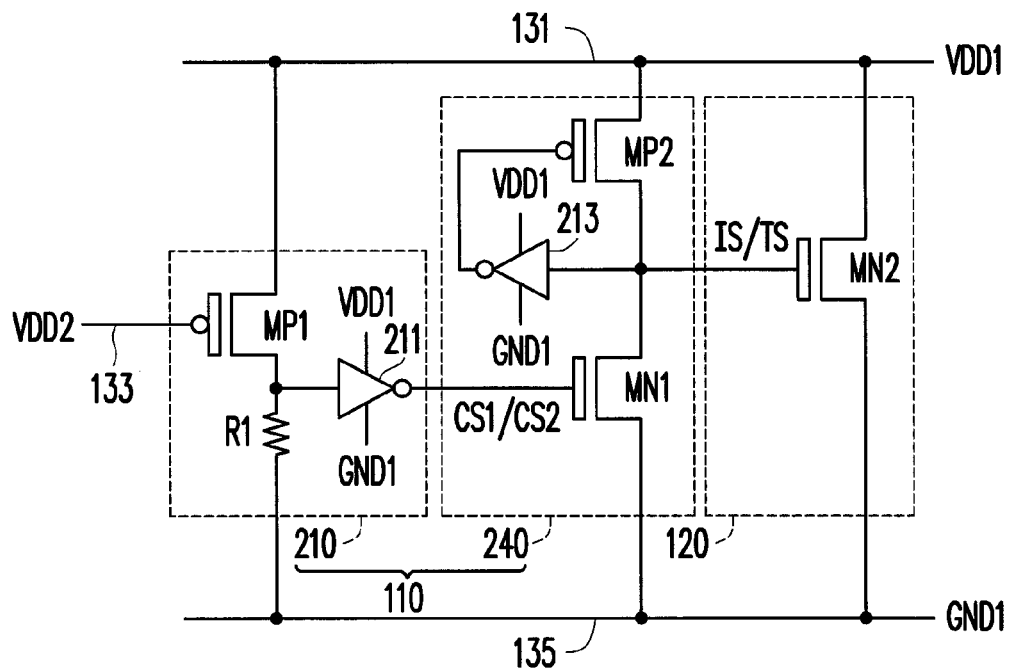
FIG. 2 shows a schematic circuit of the electrostatic discharge protection device according to the first embodiment of the invention.

For the further understanding of a person having ordinary skill in the art about the first embodiment, FIG. 2 shows a schematic circuit of the electrostatic discharge protection device according to the first embodiment of the invention. Please refer to FIG. 2 for understanding the detailed circuit and operation of the control circuit 110 and the clamp unit 120.

The control unit 110 includes a trigger unit 210 and a latching unit 240. Wherein, the trigger unit 210 is electrically connected to the power line 131, the power line 133, and the ground line 135, and the trigger unit 210 includes a p-type transistor MP1, a resistor R1, and an inverter 211. In the electrical connection, a source of the p-type transistor MP1 is electrically connected to the power line 131, and a gate of the p-type transistor is electrically connected to the power line 133. A first end of the resistor R1 is electrically connected to a drain of the p-type transistor MP1, and a second end of the resistor R1 is electrically connected to the ground line 135. The inverter 211 includes an input terminal, an output terminal, a power terminal, and a ground terminal. The input terminal of the inverter 211 is electrically connected to the first end of the resistor R1, and the power terminal of the inverter 211 is electrically connected to the power line 133 for receiving the power voltage VDD1, and the ground terminal of the inverter 211 is electrically connected to the ground line 135 for receiving the ground voltage GND1. And, the output terminal of the inverter 211 is used to output a control signal CS1 or a control signal CS2.

In the general operation, if the power voltages VDD1 and VDD2 are respectively provided to the power lines 131 and 133, the gate of the p-type transistor MP1 will receive the power voltage VDD2 and will cause the p-type transistor MP1 to be turn off. Because the second end of the resistor R1 is electrically connected to the ground line 135, the ground voltage GND1 will be transmitted to the input terminal of the inverter 211 through the resistor R1. Thus, the inverter 211, which is operated between the power voltage VDD1 and the ground voltage GND1, will generate the control signal CS1 having a high voltage level, e.g. the power voltage VDD1, in response to the received ground voltage GND1.

In addition, for making sure that the p-type transistor MP1 is turned off when the power voltages VDD1 and VDD2 are biased on the p-type transistor MP1. Therefore, the power voltage VDD1 is necessary less than or equal to the power voltage VDD2. In the real application, the electrostatic discharge protection device 100 could be applied in e.g. a flash memory device. Meanwhile, the power voltages VDD1 and VDD2 required by the flash memory device are two voltages with the same values, and allow the control unit 110 to operate normally. In other words, circuits with the power voltages correspondent with the condition described above are all in the range of the applications of the electrostatic discharge protection device 100.

When the power voltages VDD1 and VDD2 are not provided, the power line 133 is floating. Therefore, at this time the gate of the p-type transistor MP1 is close to the ground voltage. In the meantime, if the electrostatic event occurs on the power line 131, the electrostatic signal (e.g. a positive pulse signal) will cause the p-type transistor to be turned on. Thus, the electrostatic signal will be transmitted to the input terminal of the inverter 211 through the p-type transistor MP1, and further cause the inverter 211 to generate the control signal CS2 having a low voltage level, e.g. the ground voltage GND1.

The latching unit 240 includes a p-type transistor MP2, an inverter 213, and an n-type transistor MN1. Wherein, a source of the n-type transistor MN1 is electrically connected to the ground line 135, a drain of the n-type transistor MN1 is electrically connected to a drain of the p-type transistor MP2, and a gate of the n-type transistor NM1 is used to receive the control signal CS1 or the control signal CS2. The inverter 213 includes an input terminal, an output terminal, a power terminal, and a ground terminal. The input terminal of the inverter 213 is electrically connected to the drain of the p-type transistor MP2, and the power terminal of the inverter 213 is electrically connected to the power line 131 for receiving the voltage power VDD1, and the ground terminal of the inverter 213 is electrically connected to the ground line 135 for receiving the ground power GND1. And, the output terminal of the inverter 213 is electrically connected to a gate of the p-type transistor MP2. A source of the p-type transistor MP2 is electrically connected to the power line 131, and the drain of the p-type transistor MP2 is used to generate the isolation signal IS or the trigger signal TS.

If the power voltages VDD1 and VDD2 are respectively applied to the power line 131 and the power line 133, the n-type transistor MN1 will receive the control signal CS1 having the high voltage level, and further cause the n-type transistor MN1 to be turned on. Thus, the drain of the n-type transistor MN1 will generate the isolation signal IS having the low voltage level, e.g. the ground voltage GND1. On the other hand, the ground voltage GND1 will be transmitted from the ground line 135 to the input terminal of the inverter 213. Thus, the inverter 213, which is operated between the power voltage VDD1 and the ground voltage GND 1, will generate a signal having the high voltage level (e.g. the power voltage VDD1) to the gate of the p-type transistor MP2 in response to the received ground voltage GND1, and will further cause the p-type transistor MP2 to be turn-off.

If the power voltages VDD1 and VDD2 are not provided and the electrostatic event occurs on the power line 131, the trigger unit 210 will generate the control signal CS2 having the low voltage level. Meanwhile, the gate of the n-type transistor MN1 will receive the control signal CS2 having the low voltage level, and cause the n-type transistor MN1 to be turned off. In addition, the electrostatic signal (e.g. a positive pulse signal) from the power line 131 will be coupled to the drain of the n-type transistor MN1. Thus, the drain of the n-type transistor MN1 will generate the trigger signal TS having the high voltage level. On the other hand, the input terminal of the inverter 213 is electrically connected to the drain of the n-type transistor MN1. Therefore, the electrostatic signal (e.g. a positive pulse signal) from the power line 131 will also be coupled to the input terminal of the inverter 213. Thus, the inverter 213 will automatically latch the voltage level in the drain of the n-type transistor MN1 through the p-type transistor MP2. That is, the inverter 213 will generate a signal having a low voltage level to the gate of the p-type transistor MP2, and further cause the P-type transistor MP2 to be latched in the state of turn-on.

The clamp latching unit 120 includes an n-type transistor MN2, wherein a source of the n-type transistor MN2 is electrically connected to the ground power 135, and a drain of the n-type transistor MN2 is electrically connected to the power line 131, and a gate of the n-type transistor MN2 receives the isolation signal IS or the trigger signal TS. In the operation, if the power voltages VDD1 and VDD2 are applied, the n-type transistor MN2 will receive the isolation signal IS. Because the voltage level of the isolation signal IS is the ground voltage GND1, the n-type transistor MN2 is turned off. At this time, the discharging path will be disconnected from the power line 131 to the ground line 135, and will further prevent a leakage current from the power voltage VDD1 to the ground line 135.

If the voltages VDD1 and VDD2 are not applied and the electrostatic occurs on the power line 131, the n-type MN2 will receive the trigger signal TS in response to the applied voltages. Because the voltage level of the trigger signal TS is the high voltage level, the n-type transistor MN2 is turned on. Thus, the electrostatic signal will be guided to the ground line 135, and the protected circuit will not be affected by the electrostatic signal.

As described above, if the electrostatic event occurs on the power line 131, the clamp unit 120 will turn on the discharging path, and will cause the protected circuit to be unaffected by the electrostatic signal. On the other hand, in the normal operation, since the p-type transistor MP1 is turned off under the condition that the transistor MP1 is controlled by the two voltages VDD1 and VDD2, the control circuit are not easily affected by noises on the power lines 131 and 133.

For example, FIG. 3A to FIG. 3E respectively show the view of simulation wave according to the first embodiment of the invention. Wherein, the horizontal axis represents time (unit: ns, nano second), and the vertical axis represents voltage (unit: V, volt). As shown in the left part of FIG. 3A, when the electrostatic occurs on the power line 131, a positive pulse signal PS occurs on the power line 131, and the control circuit 110 generates the trigger signal TS having the same voltage level as the positive pulse signal PS, and further causes the clamp unit 120 to turn on the discharging path. Furthermore, as shown in the wave view of the right part of FIG. 3A, in the normal operation the power voltages VDD1 and VDD2 are all about 3.6V, and the control unit generates the isolation signal IS having a low voltage level e.g. 0V, and causes the clamp unit 120 to disconnect the discharging path.

Figure 3A:
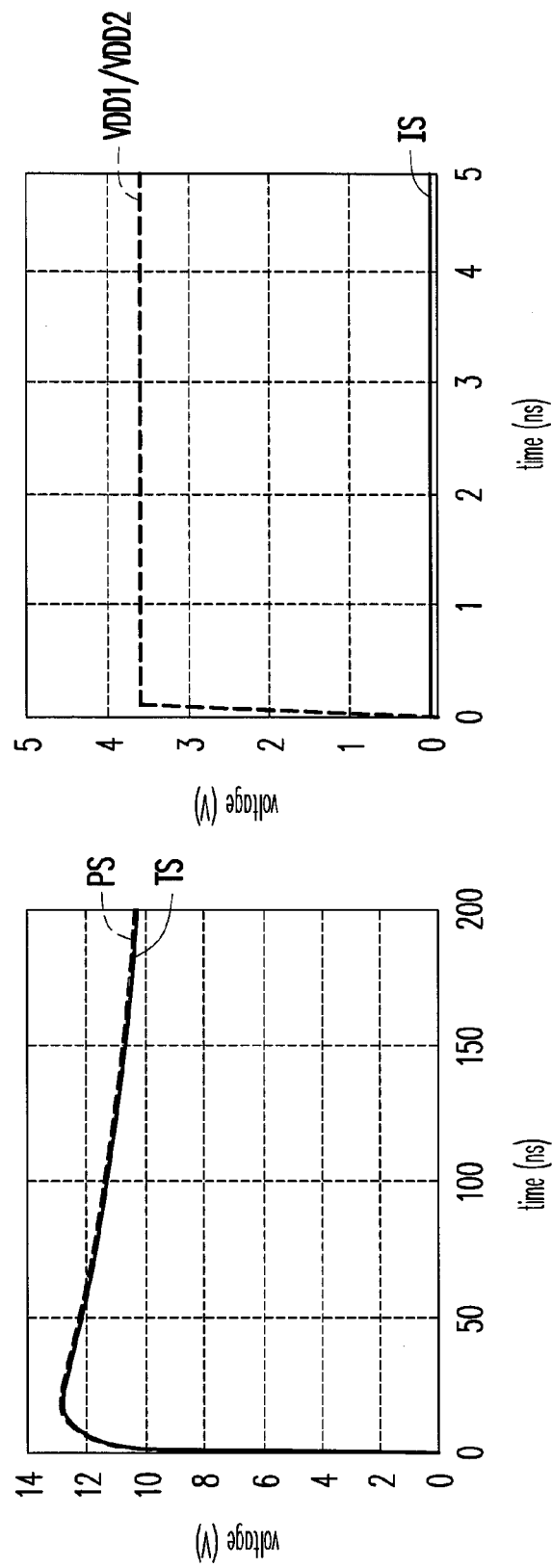
FIG. 3A to FIG. 3E respectively show the view of simulation wave according to the first embodiment of the invention.
Figure 3B:
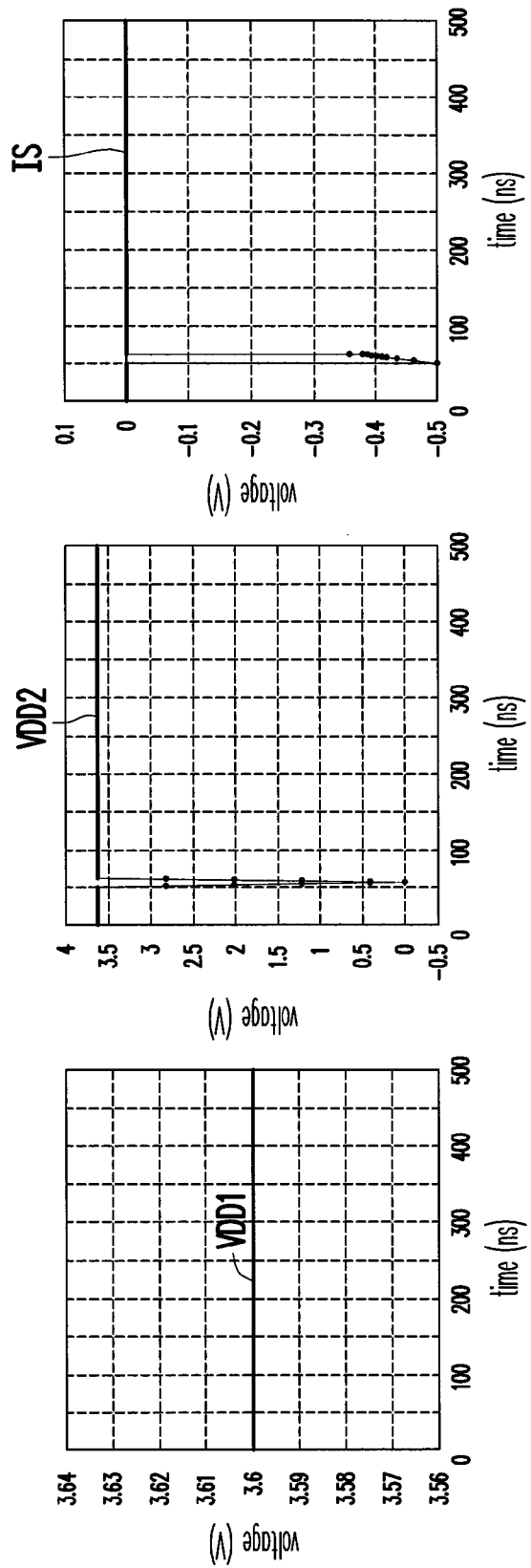
Figure 3C:
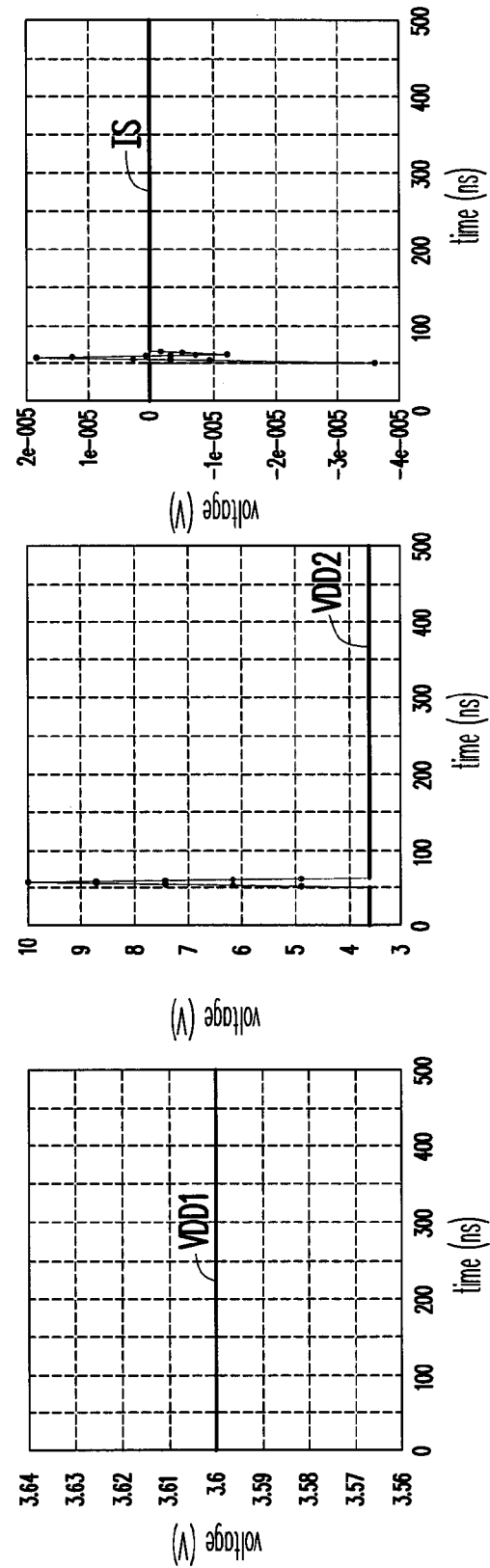

As shown in FIG. 3B, in the normal operation, when noises occur on the power line 133, i.e. when the power voltage VDD2 is pulled down from 3.6V to 0V transiently, the isolation signal IS is only pulled down from 0V to −0.5V transiently. Thus, the present clamp unit 120 still stays in the state of turn-off. On the other hand, as shown in FIG. 3C, when noise occurred on the power line 133 is a positive pulse, i.e. when the power voltage VDD2 is pulled up to 10V, the level of the isolation signal IS is almost unchanged. In other words, the present clamp unit 120 still maintain in the state of turn-off.

Figure 3D:
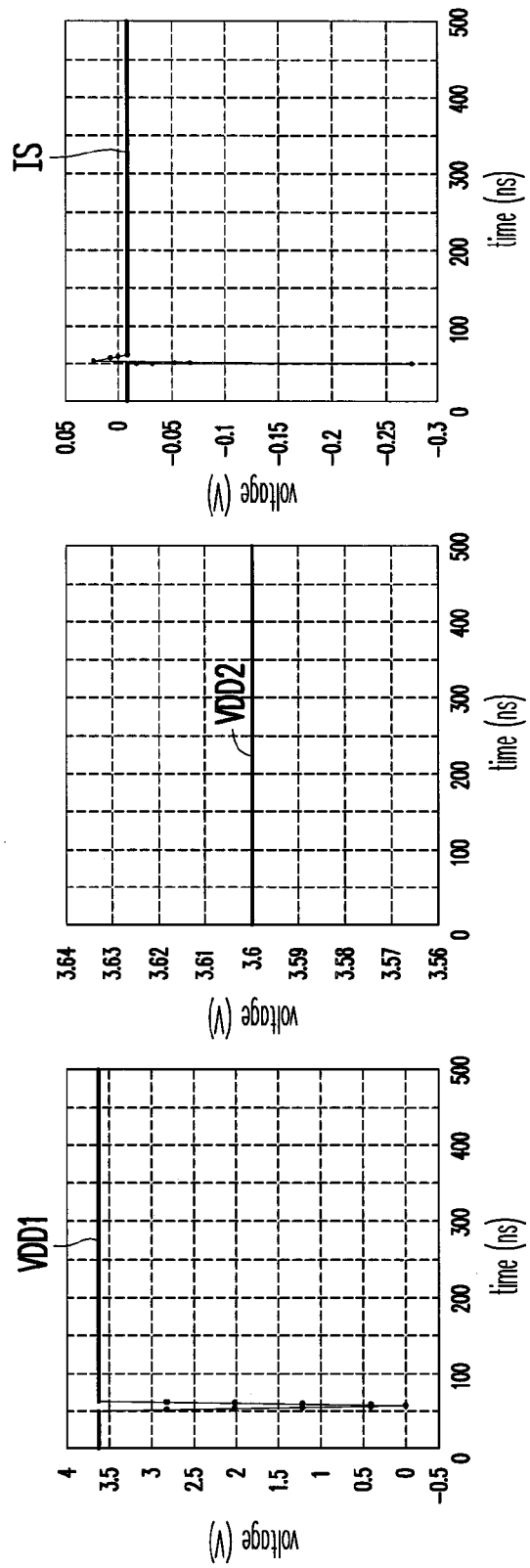
Figure 3E:
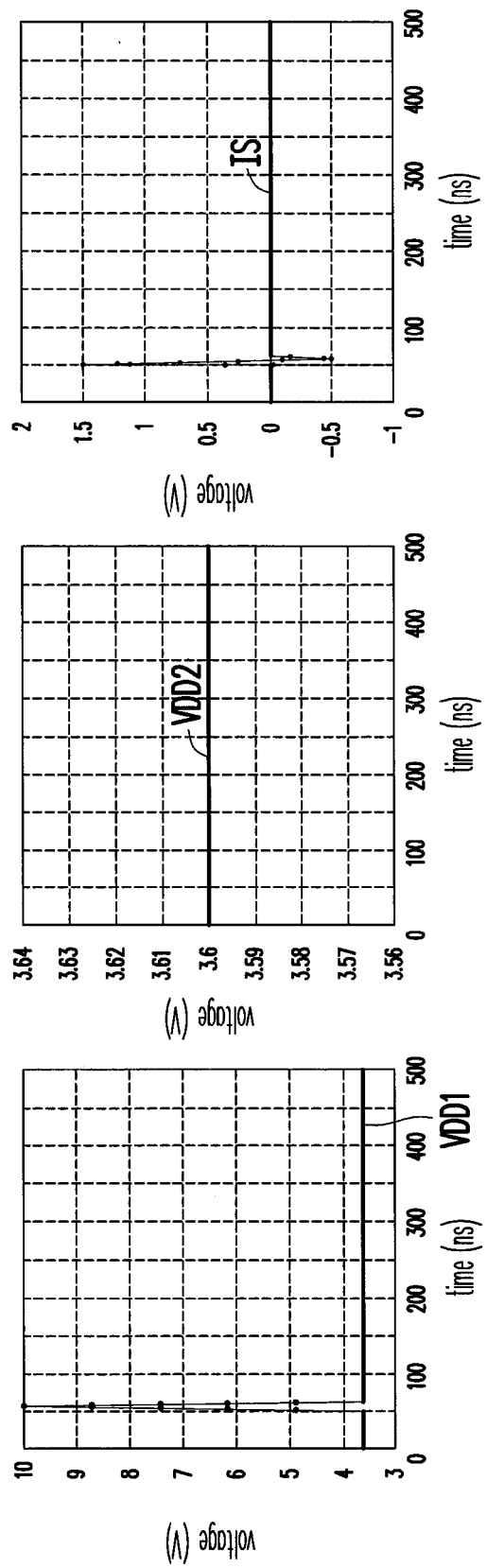

As shown in FIG. 3D, as the operation described above, when simulating that noises occur on the power line 131 and cause the power voltage VDD1 to be pulled down from 3.6V to 0V transiently, the isolation signal IS is only pulled down from 0V to −0.25V. Thus, the present clamp unit 120 still maintains in the state of turn-off. Moreover, as shown in FIG. 3E, when simulating that noises occur on the power line 131 and cause the power voltage VDD1 to be pulled up from 3.6V to 10V transiently, the isolation signal IS received by the clamp unit 120 is only pulled up from 0V to 1.5V transiently, and the clamp unit 120 still maintains in the state of turn-off.

The Second Embodiment

Figure 4:
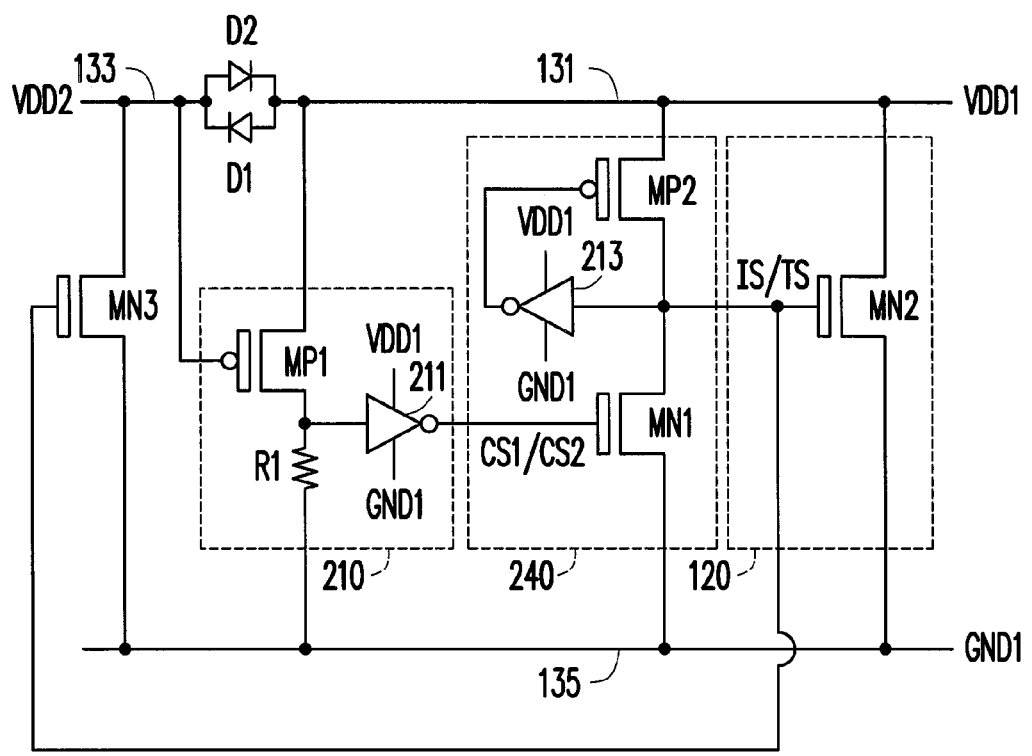
FIG. 4 shows a schematic view of the electrostatic discharge protection device according to the second embodiment of the invention.

FIG. 4 shows a schematic view of the electrostatic discharge protection device according to the second embodiment of the invention. Please refer to FIG. 4. The embodiment is roughly the same as the first embodiment. The same reference numbers used in FIG. 4 refer to the same or like parts and will not be repeated hereafter.

The main difference between this embodiment and the first embodiment is: the electrostatic discharge protection device 400 further includes an n-type transistor MN3, a diode D1, and a diode D2. Wherein, a source of the n-type transistor MN3 is electrically connected to the ground line 135, and a drain of the n-type transistor MN3 is electrically connected to the power line 133, and a gate of the transistor MN3 receives the isolation signal IS or the trigger signal TS. An anode of the diode D1 is electrically connected to the power line 131, and a cathode of the diode D1 is electrically connected to the power line 133. An anode of the diode D2 is electrically connected to the power line 133, and a cathode of the diode D2 is electrically connected to the power line 131.

For the flow of the electrostatic signal among the power line 131, the power line 133 and the ground line 135, the diode D1 and the diode D2 are respectively connected in series between the power lines 131 and 133. Besides, when an electrostatic event occurs on the power line 131, the trigger signal TS having the high voltage level is transmitted to the gate of the n-type transistor MN3, and the n-type transistor MN3 is further turned on. Moreover, as the turn-on of the n-type transistor MN3, a current loop is formed between the power line 133 and the ground line 135, and then the diode D1 is turned on due to the electrostatic signal from the power line 131. Thus, a voltage difference formed by the diode D1 assures that the p-type transistor MP1 keeps in the state of turn-on and further causes the trigger unit 210 to normally generate the control signal CS2 having a low voltage level.

The Third Embodiment

Figure 5:
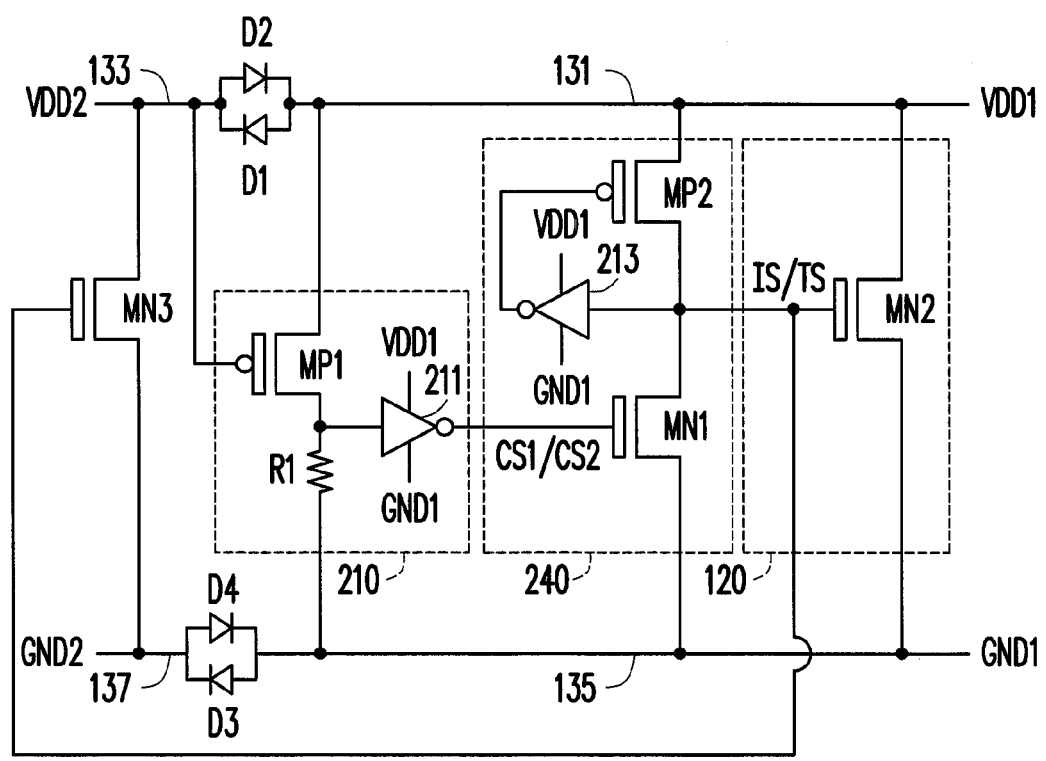
FIG. 5 shows the schematic view of the electrostatic discharge protection device according to the third embodiment of the invention.

FIG. 5 shows the schematic view of the electrostatic discharge protection device according to the third embodiment of the invention. Please refer to FIG. 5. The embodiment is roughly the same as the second embodiment. The same reference numbers used in FIG. 5 refer to the same or like parts and will not be repeated hereafter.

The main difference between his embodiment and the second embodiment is: this embodiment further includes a ground line 137, a diode D3, and a diode D4 wherein the ground line 137 is used to receive a ground voltage GND2. An anode of the diode D3 is electrically connected to the ground line 135, and a cathode of the diode D3 is electrically connected to the ground line 137. Besides, an anode of the diode D4 is electrically connected to the ground line 137, and a cathode of the diode D4 is electrically connected to the ground line 135. The electrostatic discharge protection device 500 includes the ground lines 135 and 137, and the diodes D3 and D4 are respectively connected in series between the ground lines 135 and 137 so as to further complete the flowing path of the electrostatic current.

In summary, the invention provides an electrostatic discharge protection device. The control circuit of the electrostatic discharge protection device controls the clamp unit by the two power voltages from the different power lines. Wherein, when an electrostatic event occurs, the control unit turns on the discharging unit in the clamp unit. Additionally, in the normal operation, the present control circuit disconnects the discharging path in the clamp unit. Since the control unit is controlled by the two power voltages, the control unit is not easily affected by noises. Besides, the invention disposes diodes between different power lines and between different ground lines so as to further complete the flowing path of the electrostatic current.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electrostatic discharge protection device, comprising:
   a clamp unit, providing a discharging path from a first power line to a first ground line; and
   a control circuit, receiving a first power voltage from the first power line and a second power voltage from a second power line,
   wherein the control circuit comprises a trigger unit and a latching unit, when the first power voltage and the second power voltage are applied, the trigger unit generates a first control signal and the latching unit generates an isolation signal to disconnect the discharging path, and when the first power voltage and the second power voltage are not applied, the trigger unit generates a second control signal according to an electrostatic signal from the first power line and the latching unit generates a trigger signal to turn on the discharging path, wherein the latching unit comprises:
   a first p-type transistor, comprising a source electrically connected to the first power line, and a drain for generating the isolation signal or the trigger signal;
   a first inverter, comprising an input terminal electrically connected to the drain of the first p-type transistor, and an output terminal only connected to a gate of the first p-type transistor; and
   a first n-type transistor, comprising a source electrically connected to the first ground line, a drain electrically connected to the drain of the first p-type transistor, and a gate only connected to the trigger unit and for receiving the first control signal or the second control signal,
   wherein the trigger unit comprises:
   a second p-type transistor, comprising a source electrically connected to the first power line, and a gate electrically connected to the second power line;
   a resistor, comprising a first end electrically connected to the drain of the second p-type transistor, and a second end electrically connected to the first ground line; and
   a second inverter, comprising an input terminal electrically connected to the first end of the resistor, and an output terminal for outputting the first control signal or the second control signal.

2. The electrostatic discharge protection device as claimed in claim 1, wherein the clamp unit comprises a second n-type transistor, wherein a source of the second n-type transistor is electrically connected to the first ground line, a drain of the second n-type transistor is electrically connected to the first power line, and a gate of the second n-type transistor receives the isolation signal or the trigger signal.

3. The electrostatic discharge protection device as claimed in claim 1, further comprising:
   a first diode, comprising an anode electrically connected to the first power line, and a cathode electrically connected to the second power line;
   a second diode, comprising an anode electrically connected to the second power line, and a cathode electrically connected to the first power line; and
   a third n-type transistor, comprising a drain electrically connected to the second power line, a gate receiving the isolation signal or the trigger signal, and a source electrically connected to the first ground line or a second ground line.

4. The electrostatic discharge protection device as claimed in claim 3, wherein the source of the third n-type transistor is electrically connected to the second ground line, and the electrostatic discharge protection device further comprises:
   a third diode, comprising an anode electrically connected to the first ground line, and a cathode electrically connected to the second ground line; and
   a fourth diode, comprising an anode electrically connected to the second ground line, and a cathode electrically connected to the first ground line.

5. The electrostatic discharge protection device as claimed in claim 1, wherein the first power voltage is equal to the second power voltage.

6. An electrostatic discharge protection device, comprising:
   a control circuit, electrically connected to a first power line, a second power line, and a first ground line; and
   a clamp unit, providing a discharging path from the first power line to the first ground line,
   wherein the control circuit comprises a trigger unit and a latching unit, when a first power voltage and a second power voltage are respectively applied to the first power line and the second power line, the trigger unit generates a first control signal and the latching unit generates an isolation signal to disconnect the discharging path, and when the first voltage and the second voltage are not provided, the trigger unit generates a second control signal according to an electrostatic signal from the first power line and the latching unit generates a trigger signal to turn on the discharging path, wherein the latching unit comprises:

a first p-type transistor, comprising a source electrically connected to the first power line, and a drain for generating the isolation signal or the trigger signal;

a first inverter, comprising an input terminal electrically connected to the drain of the first p-type transistor, and an output terminal only connected to a gate of the first p-type transistor; and a first n-type transistor, comprising a source electrically connected to the first ground line, a drain electrically connected to the drain of the first p-type transistor, and a gate only connected to the trigger unit and for receiving the first control signal or the second control signal, wherein the trigger unit comprises:

a second p-type transistor, comprising a source electrically connected to the first power line, and a gate electrically connected to the second power line;

a resistor, comprising a first end electrically connected to the drain of the second p-type transistor, and a second end electrically connected to the first ground line; and a second inverter, comprising an input terminal of the first inverter electrically connected to the first end of the resistor, and an output terminal for outputting the first control signal or the second control signal.

7. The electrostatic discharge protection device as claimed in claim 6, wherei the clamp unit comprises a second n-type transistor, wherein a source of the second n-type transistor is electrically connected to the first ground line, a drain of the second n-type transistor is electrically connected to the first power line, and a gate of the second n-type transistor receives the isolation signal or the trigger signal.

8. The electrostatic discharge protection device as claimed in claim 6, further comprising:

a first diode, comprising an anode electrically connected to the first power line, and a cathode electrically connected to the second power line;

a second diode, comprising an anode electrically connected to the second power line, and a cathode electrically connected to the first power line; and a third n-type transistor, comprising a drain electrically connected to the second power line, a gate receiving the isolation signal or the trigger signal, and a source electrically connected to the first ground line or a second ground line.

9. The electrostatic discharge protection device as claimed in claim 8, wherein the source of the third n-type transistor is electrically connected to the second ground line, and the electrostatic discharge protection device further comprises:

a third diode, comprising an anode electrically connected to the first ground line, a cathode electrically connected to the second ground line; and a fourth diode, comprising an anode electrically connected to the second ground line, and a cathode electrically connected to the first ground line.

10. The electrostatic discharge protection device as claimed in claim 6, wherein the first power voltage is equal to the second power voltage.

* * * * *